April 24, 1962  B. F. WARE  3,031,068
WIRE LUBRICATING DEVICE
Filed July 21, 1954  3 Sheets-Sheet 1

INVENTOR.
BEN F. WARE
BY Hudson Boughton,
Williams, David & Hoffmann
ATTORNEYS

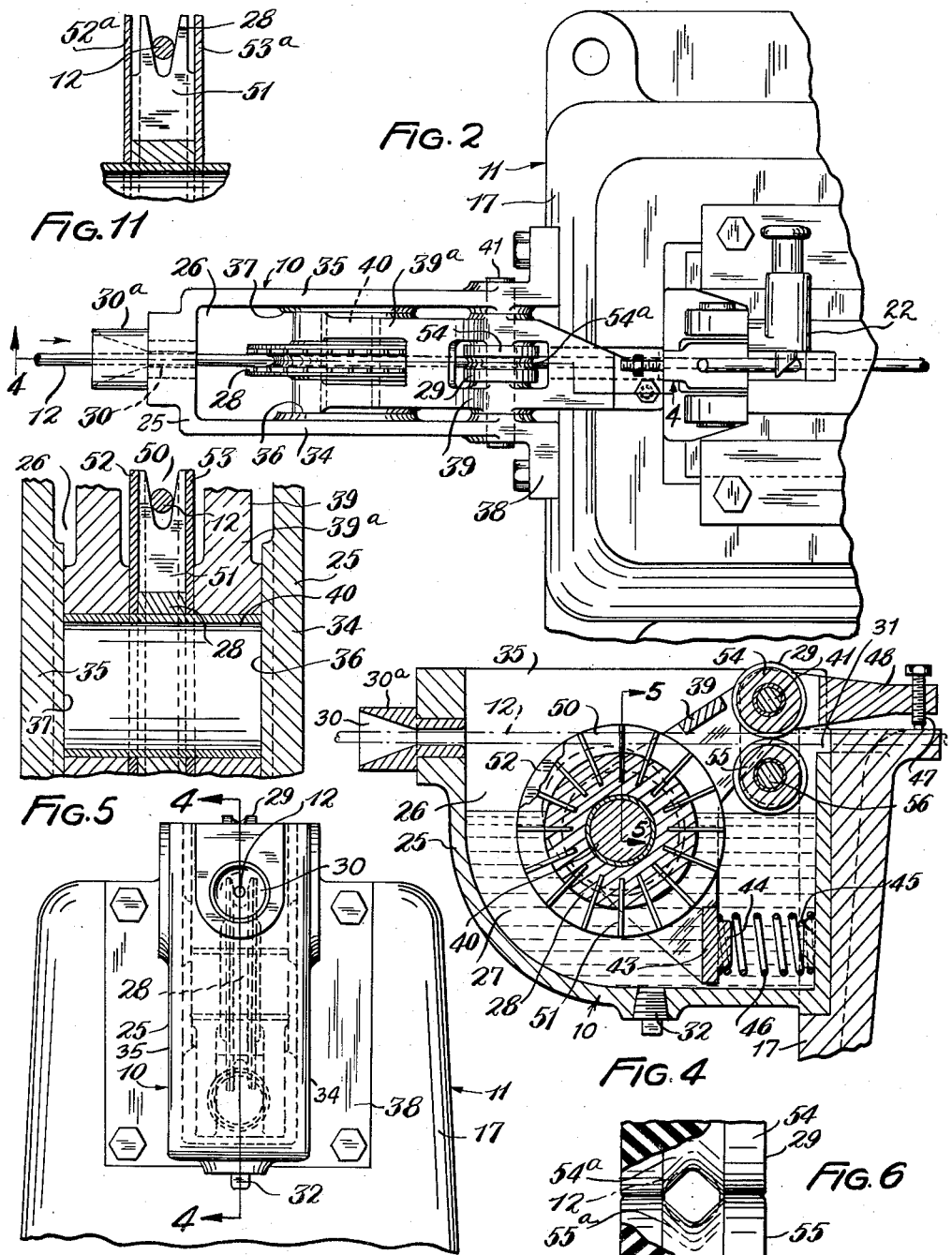

April 24, 1962     B. F. WARE     3,031,068
WIRE LUBRICATING DEVICE

Filed July 21, 1954     3 Sheets-Sheet 3

INVENTOR.
BEN F. WARE
BY Hudson, Boughton,
Williams, David & Hoffmann
ATTORNEYS

United States Patent Office 3,031,068
Patented Apr. 24, 1962

3,031,068
WIRE LUBRICATING DEVICE
Ben F. Ware, Euclid, Ohio, assignor to The Ajax Manufacturing Company, Euclid, Ohio, a corporation of Ohio
Filed July 21, 1954, Ser. No. 444,772
1 Claim. (Cl. 205—19)

This invention relates generally to wire drawing and to wire drawers and, more particularly, to lubricant applying mechanism for applying lubricant to a wire or the like being advanced, such as a wire being supplied to a wire drawing machine.

In wire drawers of the reciprocating type which are frequently used in a connected relation to a cold header or the like, lubricant has heretofore been applied to the wire in the form of a dry powder. Such a dry lubricant has been satisfactorily applied to the wire by providing a quantity of the dry lubricant in a pocket located in the die carrier immediately ahead of the drawing die.

For various reasons, it may be desirable to apply a liquid lubricant to the wire instead of such a dry lubricant. To apply the liquid lubricant to the wire by the same means as is used for applying the dry lubricant is not practical because of undesirable and unavoidable leaking and dripping of the liquid lubricant which would occur, particularly in wire drawers of the type having a reciprocable die carrier.

As one of its objects, this invention accordingly provides novel means for applying a liquid lubricant to a wire or the like being advanced such that undesirable leaking and dripping of the lubricant is avoided.

Another object is to provide lubricant applying means for use in applying lubricant to a wire or the like being advanced, such as a wire being supplied to the drawing die of a wire drawer, comprising a rotatable wheel over which the wire passes and which has a sector thereof immersed in a body of the liquid lubricant such that the rotation of the wheel causes lubricant to be picked up and applied to the wire.

A further object is to provide lubricant applying means of the character mentioned which also embodies means for removing excess lubricant from the wire, preferably at a point where the excess lubricant will be returned to the reservoir containing the body of liquid lubricant.

Still another object is to provide lubricant applying means of the character above indicated in which the wheel is peripherally grooved to receive the wire and has pick-up means thereon, preferably in the form of radiating slots, for picking up the lubricant and supplying it to the groove for application to the wire.

Yet another object is to provide lubricant applying means of the kind indicated above in which the wheel is shiftably supported, preferably by swingable lever means, for movement into engagement with the wire to be driven by the latter.

It is also an object of this invention to provide lubricant applying means of the character mentioned in which side plates on opposite sides of the wheel at least partially confine the lubricant being picked up by the slots.

As another important object, this invention provides lubricant applying means of the above-indicated type in which cooperating squeeze rolls engage the wire for removing the excess lubricant, the rolls preferably being of a resiliently yieldable material.

Additionally, this invention provides such a lubricant applying means as an attachment device for mounting on the frame of a reciprocating wire drawer and having an open-top housing defining a pocket for the supply of liquid lubricant and across which pocket the wire is advanced, and in which the wheel is rotatably supported in the pocket by a swingable lever such that a lower segment of the wheel is immersed in the lubricant and an upper segment is adapted to be pressed into wheel-driving engagement with the wire.

The invention can be further briefly summarized as consisting in certain novel combinations and arrangements of parts hereinafter described and particularly set out in the claim hereof.

In the accompanying sheets of drawings forming a part of this specification:

FIG. 2 is a partial plan view of the lubricant applying means and of the adjacent end of the wire drawer;

FIG. 3 is an end view of the lubricant applying means;

FIG. 4 is a vertical longitudinal section taken through the lubricant applying means as indicated by section line 4—4 of FIGS. 2 and 3;

FIG. 5 is a partial transverse vertical section on a somewhat larger scale and taken on section line 5—5 of FIG. 4;

FIG. 6 is a fragmentary elevational view showing the squeeze rolls for removing excess lubricant from the wire;

FIG. 11 is a fragmentary vertical section showing a modified construction for the pick-up wheel.

Figure 1:
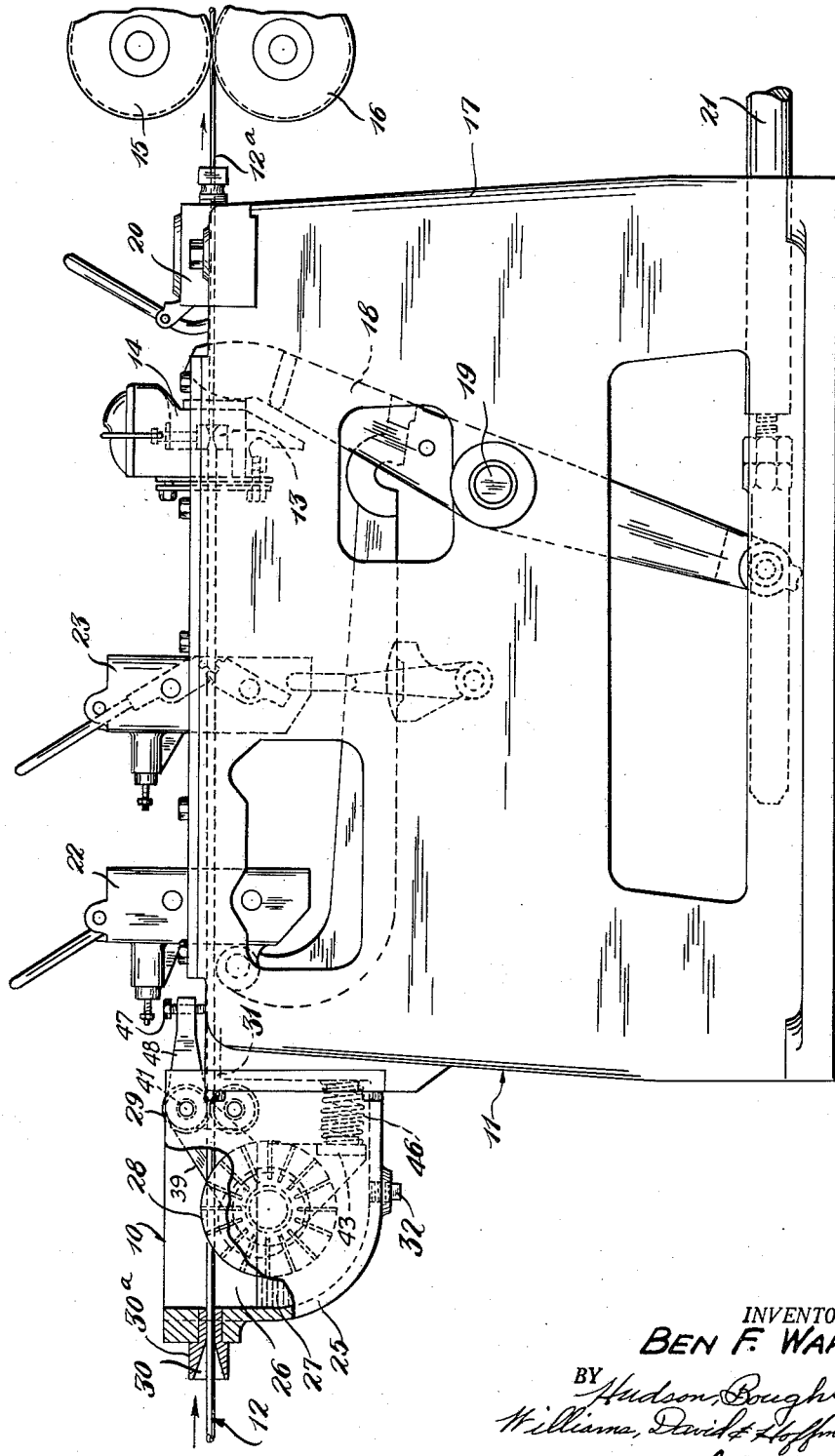
FIG. 1 is a side elevation showing a wire drawer embodying the lubricant applying means of this invention.

The lubricant applying means 10 of the present invention is disclosed herein as being used in conjunction with or as a part of a wire drawer 11 to which a wire 12 to be drawn is being supplied.

The wire drawer 11 is here shown as being of the kind disclosed in earlier United States Patent 2,226,400, granted December 24, 1940, and having a drawing die 13 carried by a reciprocable slide 14. The wire drawer 11 is also of the kind which is used immediately in advance of a fabricating machine, such as a cold header, for supplying the drawn wire stock 12$^a$ to the fabricating machine at the rate needed by the latter and at substantially the rate at which the drawn stock is produced by the wire drawer. The fabricating machine is here represented only by the feed rolls 15 and 16 thereof which advance the wire 12 and feed the drawn wire 12$^a$ to the dies of such fabricating machine.

The wire drawer 11 is further briefly described as comprising a hollow frame 17 having a draw lever 18 swingable therein on a transverse pivot shaft 19 for intermittently moving the die slide 14 toward the left through successive drawing strokes during which the drawing die 13 is pushed over the wire 12. During these successive drawing strokes, the wire is held against backward movement by a grip device 20. The draw lever 18 is actuated by a pull rod 21 connected therewith and extending to the fabricating machine for reciprocation by the latter. The return stroke of the die slide 14 is produced by the advance movement of the wire 12 which is imparted thereto by the feed rolls 15 and 16, or by such feed rolls assisted by suitable spring means acting on the die slide, such as the spring means shown in the above-mentioned patent.

The wire drawer 11 is here shown as also including an inching slide 22 and an inching grip device 23 which are used in the manner explained in the above-mentioned patent for starting the wire 12 through the drawing die 13.

The lubricant applying means 10 comprises in general a housing 25 having a chamber or pocket 26 therein adapted to contain a supply of the lubricating material 27, a pick-up or transfer wheel 28 rotatable in the pocket 26, and a lubricant removing device 29 for removing excess lubricant from the wire 12. The lubricant applying means 10 is here shown as being in the form of an attachment device mounted on one end of the frame 17 of the wire drawer 11 but, if desired, this lubricant applying means could be suitably built into the wire drawer 11.

The housing 25 is preferably an open-top housing and has laterally aligned inlet and outlet openings 30 and 31 through which the wire 12 is movable through and across the pocket 26. The inlet opening 30 is preferably formed by the passage of a guide bushing 30ª. The lubricant 27 is here shown as being a body of liquid lubricant or so-called "drawing compound" contained in the lower portion of the pocket 26 such that the surface level of the lubricant normally stands below the inlet and outlet openings 30 and 31. A drain plug 32 provided at the bottom of the housing 25 permits the drainage of lubricant from the pocket 26 when desired.

The housing 25 is constructed with substantially parallel vertical side walls 34 and 35 having bosses on the adjacent sides thereof defining a pair of opposed, substantially flat bearing faces 36 and 37 at oposite sides of the pocket 26. The housing 25 is also provided at its forward end with flange means 38 by which the lubricant applying means 10 can be bolted or otherwise suitably attached to the frame of the wire drawer 11.

The wheel 28 is rotatably supported in the pocket 26 by a swingable lever 39 having a forked arm 39ª extending into the pocket. Side portions of the arm 39ª slidably engage the bearing surfaces 36 and 37 for vertically guiding the movements of the lever in the pocket 26. The wheel 28 is rotatably mounted in the forked portion of the arm 39ª by a suitably pivot shaft 40. The lever 39 is swingable on a transverse pivot shaft 41 which is mounted in the housing 25 at a point above the level of the lubricant 27.

The lever 39 also includes a downwardly extending arm portion 43 carrying a spring seat 44 which is located substantially opposite a spring seat 45 provided on the housing 25 interiorly thereof and adjacent the bottom of the pocket 26. A compression spring 46 having its ends in engagement with the spring seats 44 and 45 acts on the lever 39, tending to swing the latter in a direction to lift the wheel 28. This upward movement of the wheel 28 by the action of the spring 46 is limited in extent by stop means comprising a stop screw 47 carried by a forwardly extending arm projection 48 of the lever 39. The stop screw 47 is here shown as being engageable with a portion of the frame of the wire drawer 11 and as being adjustable in the arm projection 48 for varying the extent of such upward movement of the wheel 28.

The wheel 28 is provided with a substantially V-shaped peripheral groove 50 in which the wire 12 engages when the wheel is moved upwardly against the wire by the action of the compression spring 46. The wheel 28 is preferably rotated by the advance movement of the wire 12 as the result of the engagement of the wire in the V-shaped groove 50. The rotation of the wheel 28 with its lower segment immersed in the body of lubricant 27 and with its upper segment engaged with the wire 12 causes lubricant to be picked up by the wheel and applied to the wire.

To increase the effectiveness of the wheel 28 in picking up lubricant, the wheel is provided with pick-up means which is here shown as being in the form of radiating slots 51 extending away from the shaft 40 and intersecting the peripheral slot 50. As the wheel 28 is rotated, the slots 51 are moved in succession to a submerged position in the body of lubricant such that the lubricant will flow into and fill the submerged slots. As the rotation of the wheel moves the slots out of the body of lubricant, some of the lubricant will remain in the merging slots as pick-up chambers and will be carried into the upper sector of the wheel such that the lubricant will then flow from these slots into the peripheral groove 50 and more or less flood this groove with lubricant such that lubricant will be applied to the wire 12 around the full cricumference thereof.

For at least partially confining the lubricant in the slots 51 as they are emerging the body of lubricant 27, side plates 52 and 53 are provided on opposite sides of the wheel 28 in overlying or covering relation to the edges of the slots as shown in FIG. 5. The cover plates 52 and 53 are in the form of disks and are preferably attached to the wheel 28 so as to be rotatable therewith. If desired, the peripheral portions of the side plates can be spaced from the wheel 28 as shown for the side plates 52ª and 53ª in the modified construction of FIG. 11.

To prevent excess lubricant from being carried by the wire into the wire drawer 11, where dripping of such excess lubricant would be undesirable, the lubricant removal device 29 is provided and is located adjacent the outlet 31 such that the lubricant-coated wire passes through this removal device. The lubricant removal device 29 is here shown as comprising a pair of upper and lower squeeze rolls 54 and 55 made of a resiliently flexible material, such as neoprene or other suitable resilient material, and which rolls apply a wringer-like action to the wire during its passage therebetween. The squeeze rolls 54 and 55 are preferably located in the pocket 26 such that excess lubricant removed from the wire by the action of these rolls will flow back into the pocket.

The lower roll 55 is mounted on a pivot shaft 56 which is suitably supported in the side walls 34 and 35 of the housing 25. The upper roll 54 is mounted on the above-mentioned pivot shaft 41 on which the lever 39 is swingably mounted. If desired, squeeze rolls 54 and 55 can be provided with cooperating peripheral grooves 54ª and 55ª, as shown in FIG. 6, for the passage of the wire 12 therebetween. These grooves should preferably be of such shape and depth that the deformation of the rolls resulting from the pressure applied thereby to the wire will cause the walls of grooves to engage the surface of the wire for the full circumference thereof to thereby produce the above-mentioned wringer-like action for the removal of the excess lubricant from the wire.

Figure 8:
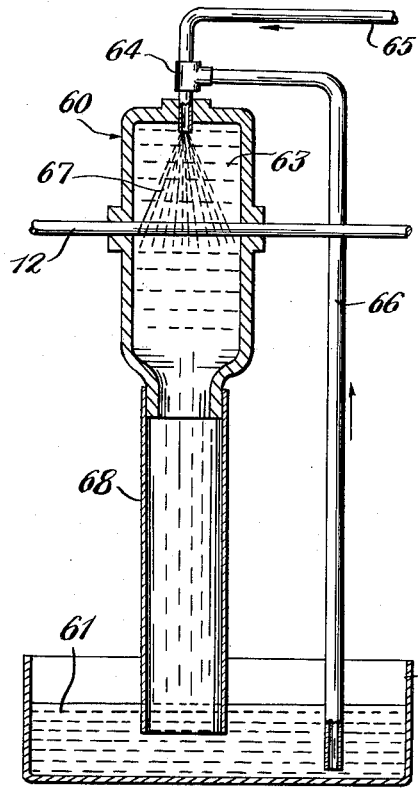
FIG. 8 is a vertical longitudinal section taken through the apparatus of FIG. 7 substantially as indicated by section line 8—8.
Figure 7:
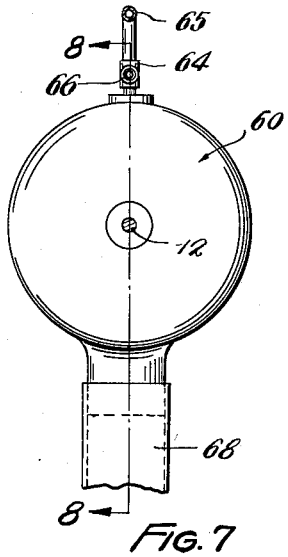
FIG. 7 is a partial end view of a lubricant applying means of a modified form in which the lubricant is sprayed against the wire.

FIGS. 7 and 8 of the drawings show lubricant applying means 60 by which liquid lubricant 61 withdrawn from the reservoir 62 is sprayed in atomized form against the wire 12 during passage of the latter through a spray chamber 63. In this form of the lubricant applying means compressed air from an available source is supplied to an aspirating and atomizing nozzle 64 by a conduit 65 such that some of the lubricant 61 will be sucked up through the conduit 66 and will be discharged into the chamber 63 as an atomized spray field or mist 67. The passage of the wire 12 across the chamber 63 and through the spray field 67 will cause lubricant to be applied to the wire with the excess lubricant being returned to the reservoir 62 through the conduit 68.

Figure 9:
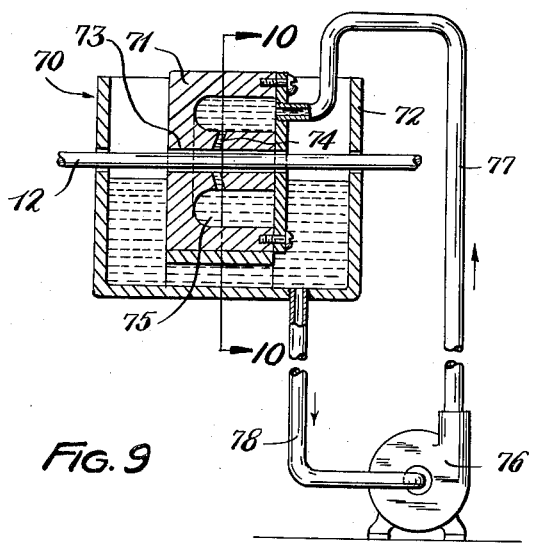
FIG. 9 is a vertical longitudinal section taken through another modified form in which the lubricant is sprayed against the wire.
Figure 10:
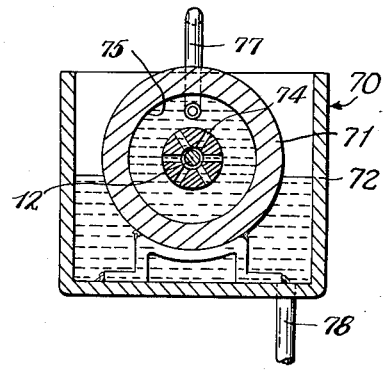
FIG. 10 is a partial transverse vertical section taken on section line 10—10 of FIG. 9.

FIGS. 9 and 10 show another modified form of lubricant applying means 70 in which a spray head 71 located in a housing 72 is provided with an axial passage 73 to accommodate the wire 12 and with radially disposed jet orifices 74 through which lubricant is sprayed against the wire. The orifices 74 are fed with lubricant from an annular recess 75 of the spray head to which lubricant is supplied under pressure by a pump 76 through a delivery conduit 77. The pump 76 is supplied with lubricant from the chamber of the housing 72 through a conduit 78. The excess lubricant which is delivered through the orifices 74 is collected in the housing 72 to be resupplied to pump 76.

From the accompanying drawings and the foregoing detailed description, it will now be readily understood that this invention provides novel lubricant applying means for applying lubricant to a wire or the like being advanced in such a manner that the wire will be effectively coated for its full circumference with a film of lubricant and such that excess lubricant will be removed from the wire so as to prevent undesirable dripping of such lubricant in a wire drawer or other machine to which the wire is being supplied. It will also be seen that the lubricant applying means of this invention is applicable to a wire drawer of the reciprocating type and can be incorporated in or connected with the drawer such that there will be no leakage nor any substantial amount of dripping of lubricant, at or adjacent the die carrier. Likewise, it will now be seen that the lubricant applying means provided by this invention employs a rotatable pick-up or transfer wheel having a segment thereof immersed in a supply of lubricant such that rotation of the wheel will cause the lubricant to be effectively applied to a wire or the like engaging another segment of the wheel. Additionally, it will be seen that the use of a pick-up or transfer wheel for this purpose permits passage of the wire through the lubricant containing pocket at a point above the level of the lubricant such that leakage of lubricant through the wire inlet and outlet openings will be avoided.

Although the lubricant applying means of this invention has been illustrated and described herein to a somewhat detailed extent, it will be understood, of course, that the invention is not to be regarded as being limited correspondingly in scope but includes all changes and modifications coming within the terms of the claim hereof.

Having thus described my invention, I claim:

In a wire lubricating device, a stationary housing having walls defining a pocket in the lower portion thereof adapted to contain a body of lubricant, said housing having inlet and outlet openings therein above the normal level of said body for passage of the wire acros ssaid pocket, pivot means on said housing above said normal level, a lever fulcrumed on said housing by said pivot means and having a downwardly extending arm swingable in said pocket, a wheel in said pocket and rotatably supported by said arm with a lower segment of the wheel immersed in said body and an upper segment engageable with said wire, spring means acting on said lever tending to cause an upward swinging of said arm for pressing said wheel against said wire such that the wheel is driven by the wire, said wheel being effective during the rotation thereof to pick up lubricant from said body and to apply such picked up lubricant to the wire, and a pair of squeeze rolls in said pocket adjacent the outlet opening and engageable with the wire for removing excess lubricant therefrom, one of said rolls being mounted for rotation about the axis of said pivot means, said inlet and outlet openings and the points of engagement of said wire with said upper segment and with said squeeze rolls being substantially in a straight line which extends across said pocket and is tangent to said wheel.

References Cited in the file of this patent

UNITED STATES PATENTS

| | | |
|---|---|---|
| 296,645 | Stubbe | Apr. 8, 1884 |
| 439,916 | Whittlesey | Nov. 4, 1890 |
| 493,101 | Luther | Mar. 7, 1893 |
| 1,416,773 | Barbour et al. | May 23, 1922 |
| 1,893,107 | Severson | Jan. 3, 1933 |
| 1,967,751 | Goerlich | July 24, 1934 |
| 1,996,392 | Torrence et al. | Apr. 2, 1935 |
| 2,196,002 | Whitney et al. | Apr. 2, 1940 |
| 2,311,616 | Gordon et al. | Feb. 16, 1943 |
| 2,398,516 | Burgeni | Apr. 16, 1946 |
| 2,442,335 | Bauer | June 1, 1948 |
| 2,545,468 | Jones | Mar. 20, 1951 |
| 2,581,638 | Deering | Jan. 8, 1952 |
| 2,654,442 | Yakopatz | Oct. 6, 1953 |
| 2,703,550 | Bell | Mar. 8, 1955 |